(12) United States Patent
Phillips et al.

(10) Patent No.: US 8,064,369 B1
(45) Date of Patent: Nov. 22, 2011

(54) SYSTEM AND METHOD FOR INCREASING DISTRIBUTION DISTANCE OF XDSL TYPE SIGNALS

(75) Inventors: Bruce A. Phillips, Highlands Ranch, CO (US); Darwei Kung, Aurora, CO (US); Todd A. Pett, Longmont, CO (US); David J. Arens, Highlands Ranch, CO (US); Paula C. Poberzyn, Highlands Ranch, CO (US); Richard H. Fink, Aurora, CO (US); Donald L. Brodigan, Broomfield, CO (US); James W. Nevelle, Highlands Ranch, CO (US); Kurt A. Campbell, Lafayette, CO (US)

(73) Assignee: Qwest Communications International Inc, Denver, CO (US)

( * ) Notice: Subject to any disclaimer, the term of this patent is extended or adjusted under 35 U.S.C. 154(b) by 0 days.

(21) Appl. No.: 09/203,086

(22) Filed: Dec. 1, 1998

(51) Int. Cl.
*H04L 5/14* (2006.01)
*H04B 3/16* (2006.01)
*H04J 1/10* (2006.01)
*H04J 3/08* (2006.01)

(52) U.S. Cl. .......... 370/274; 370/293; 370/492; 370/501

(58) Field of Classification Search ................. 370/274, 370/278, 279, 282, 293, 400, 402, 407, 465, 370/466, 467, 492, 493–495, 501, 315, 316; 379/27, 57, 88.14, 88.17, 93.14; 375/211, 375/346, 222, 219, 220, 214, 293, 317; 725/119, 725/127, 149
See application file for complete search history.

(56) References Cited

U.S. PATENT DOCUMENTS

| 4,334,303 | A | * | 6/1982 | Bertin ........................... 370/492 |
| 4,438,520 | A | * | 3/1984 | Saltzer ......................... 370/501 |
| 4,766,606 | A | * | 8/1988 | Bardutz et al. ................ 370/293 |
| 5,408,260 | A | | 4/1995 | Arnon |
| 5,534,912 | A | | 7/1996 | Kostreski |
| 5,627,501 | A | | 5/1997 | Biran et al. |
| 5,812,786 | A | | 9/1998 | Seazholtz et al. |
| 5,815,505 | A | | 9/1998 | Mills |
| 5,905,781 | A | * | 5/1999 | McHale et al. ............. 379/93.14 |
| 5,978,373 | A | * | 11/1999 | Hoff ............................. 370/351 |
| 6,084,881 | A | * | 7/2000 | Fosmark ...................... 370/466 |
| 6,118,766 | A | * | 9/2000 | Akers .......................... 370/249 |
| 6,178,179 | B1 | * | 1/2001 | Phillips et al. ................ 370/465 |
| 6,219,378 | B1 | * | 4/2001 | Wu .............................. 375/222 |
| 6,282,189 | B1 | * | 8/2001 | Eames ......................... 370/352 |

FOREIGN PATENT DOCUMENTS

WO WO 00/33512 6/2000

OTHER PUBLICATIONS

International Search Report prepared by the U.S. Patent and Trademark Office as International Searching Authority (ISA/US) for PCT International Patent Application No. PCT/US99/27535, mailed Mar. 7, 2000, 1 page.

* cited by examiner

Primary Examiner — Steven H Nguyen

(57) ABSTRACT

An XDSL signal distribution system is provided having a regenerator unit located a predetermined distance from a central office XTU unit for extending the distribution reach of the system. The regenerator is arranged to decode the payload of transmitted XDSL signals into base digital data before repackaging and regeneration onto a twisted pair copper cable. This allows the regenerator to selectively reformat the XDSL signals into a desired protocol format suitable for either an ATM protocol layer, or direct transmission. In addition, the regenerator can retransmit the XDSL signals at a fixed or variable transmission rate to optimize data throughput or system reach.

14 Claims, 1 Drawing Sheet

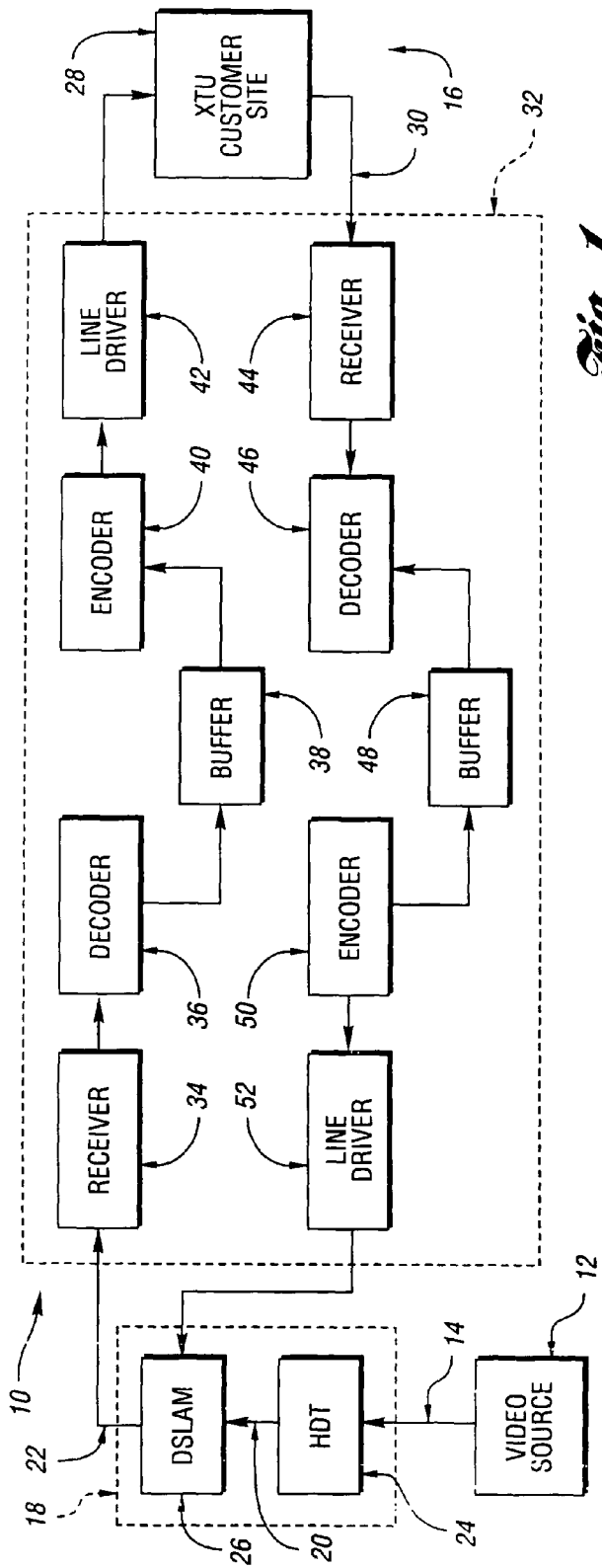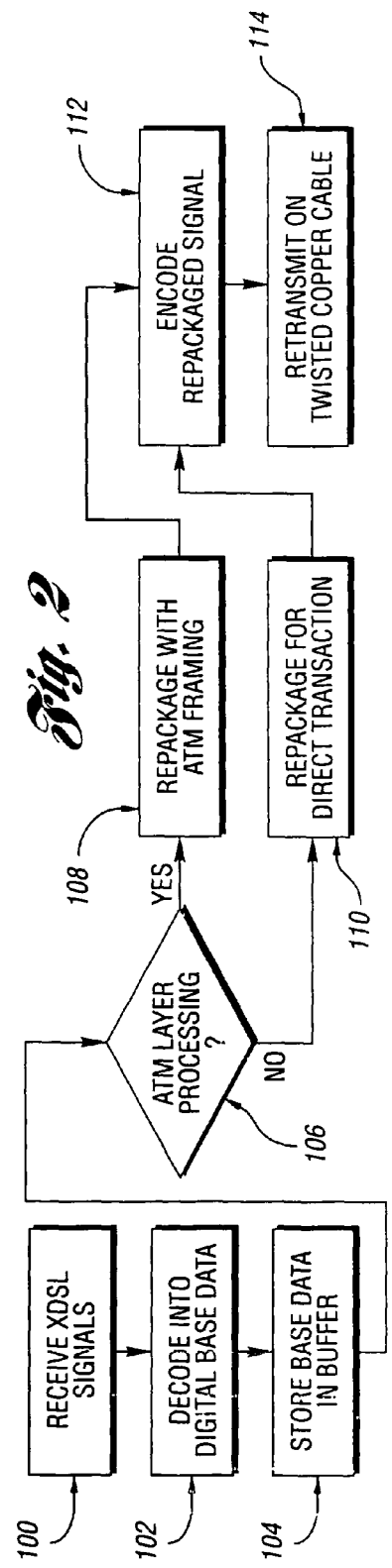

SYSTEM AND METHOD FOR INCREASING DISTRIBUTION DISTANCE OF XDSL TYPE SIGNALS

TECHNICAL FIELD

The present invention relates to an arrangement for improving transmission distances in a system using digital subscriber line (DSL) type signals to distribute video programming over public telephone line networks.

BACKGROUND ART

Generally, distribution of video signals has been carried out using a coaxial cable connected communication network. However, due to the high cost and minimal signal quality of such a distribution network, attempts have been made to provide an alternative approach to distributing video signals. For example, telephone lines have been suggested as a physical structure for implementing video signal distribution. However, systems using the public switched telephone network (PSTN) are often bandwidth limited, providing generally only still frame or video conferencing capabilities. In addition, because telephone system carriers only typically use the PSTN for connectivity between subscribers, the PSTN does not provide any capability for dynamic routing digitized video without the use of dedicated leased, wide bandwidth circuits. Telephone line based systems also fail to provide acceptable VCR type functional control over the distribution of video programming.

On the other hand, an enhanced public switched telephone network does provide the capability distributing video on demand to subscribers over the PSTN. In such an arrangement, a menu of video programming information is made accessible at a subscriber's premises. A subscriber may transmit ordering information via the PSTN to available independent video information providers. Video programming can then be accessed and transmitted to the subscriber directly from a video information provider or through a central office (CO) serving the subscriber. The video information provider is suitably arranged to transmit coded digital video data over wideband PSTN connected to the CO. The video data may be buffered at the central office for transmission over a plain old telephone service (POTS) line to the subscriber. Subscribers may use either a standard telephone or a dedicated control device located at a television set to order the video programming.

The central office can be connected to the various subscribers for transmission of video data using an asymmetrical digital subscriber line (ADSL) system. In such an arrangement, multiple ADSL interface units would be deployed to perform multiplexing of digital video information with voice information to be transmitted to the subscriber. The ADSL units would also provide support for transmission of one or more reverse control channels from the subscriber to the central office. The ADSL interface units are typically located at the central office and the subscriber location and are operative to combine video information together with bidirectional signalling and POTS for transmission over an ordinary telephone wiring plant.

However, known ADSL type transmission systems have not proven to be fully satisfactory. When environmental interference situations arise, ADSL transmission is more sensitive than POTS. As transmission distances over copper wire pairs exceed 18,000 feet, the signal quality of ADSL signals becomes seriously degraded. Thus, a need exists for a video signal distribution system which overcomes the above-noted problems.

DISCLOSURE OF INVENTION

Therefore, it is an object of the present invention to provide a system and method for distributing digitized video signals which overcomes the limitations on system flexibility and distribution range found in prior proposals.

It is another object of the present invention to provide a system and method for distributing DSL type signals which overcomes the limited distribution range in cost effective manner.

In accordance with these and other objects, the present invention provides a system for distributing digital subscriber line (XDSL) signals to end users over a telephone wiring plant having a central office for receiving video signals from a video source. The central office includes a first XDSL transmission unit for transmitting the received video signals on a twisted pair copper cable along with other telephony and digital data signals, and for receiving any data signals transmitted from end users. At least one end user location includes a second XDSL transmission unit for receiving video signals from the twisted pair copper cable, and for transmitting other data signals back to the central office. A regenerator is connected to the twisted pair copper cable and located a predetermined distance from the central office. The regenerator includes a receiver for receiving XDSL signals transmitted on the twisted pair copper cable from either the central office or the end user, a decoder for decoding the payload of a received XDSL signal into base data, an encoder for repackaging and encoding the base data into a desired protocol format, and a line driver for retransmitting the encoded signal onto the twisted pair copper cable for distribution to the original destination. In accordance with the present invention, the predetermined distance for the location of the repeater corresponds to a point on the twisted pair cable where the signal-to-noise ratio of a transmitted XDSL signal reaches a threshold of minimum acceptable signal quality.

In accordance with other features, the central office can transmit XDSL signals using an asynchronous transfer mode (ATM) protocol, and the regenerator encoder would be arranged to selectively repackage the base data into either the ATM protocol format or a direct transmission protocol format depending on the protocol requirements of the destination terminal. The XDSL signals are preferably in the form of very-high-rate digital subscriber line (VDSL) type signals, or asynchronous digital subscriber line (ADSL) type signals.

In accordance with another aspect of the present invention, a method is provided for distributing digital subscriber line (XDSL) signals to end users over a telephone wiring plant including receiving video signals at a central office from a video source, transmitting the received video signals on a twisted pair copper cable along with other telephony and digital data signals as an XDSL type signal to a terminal located at an end user site, and receiving data signals on the twisted pair copper cable at the central office from an end user terminal, and coupling a signal regenerator unit to the twisted pair copper cable at a distance from the central office corresponding to a point on the twisted pair cable where the signal-to-noise ratio of a transmitted XDSL signal reaches a threshold of minimum acceptable signal quality. The transmitted XDSL signals are received at the regenerator, and decoded into base data. The base data is repackaged and encoded into an XDSL signal having a desired protocol format, and retransmitted to the original destination terminal.

In accordance with other features, the regenerated signals can be transmitted using either a fixed rate or a variable rate of transmission.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a block diagram of a XDSL distribution system incorporating a regenerator in accordance with the present invention; and FIG. 2 is a flow chart illustrating overall system operation in accordance with the present invention.

BEST MODE FOR CARRYING OUT THE INVENTION

Referring to FIG. 1, an XDSL signal distribution system 10 is shown in accordance with the present invention. It is noted for purposes of understanding the present invention, the term XDSL is used as a broad label for identifying a number of different types of digital subscriber line (DSL) signal formats, such as rate adaptive DSL (RADSL), ADSL, high density DSL (HDSL), and very-high-data-rate density DSL (VDSL). The present invention as described below can be suitably adapted for anyone of these formats.

As shown in FIG. 1, a video source 12 generates suitable video signals 14 for distribution to one or more customer sites 16. More specifically, the video signals are initially transmitted to a XDSL transmission unit ($XTU_{co}$) located at a central office location 18. The $XTU_{co}$, then retransmits the signals on a distribution line formed from a fiber optic cable 20, and a twisted pair copper cable 22. The $XTU_{co}$ includes a suitable host digital terminal (HDT) 24 and a digital subscriber line access multiplexer (DSLAM) 26 for combining telephony and digital data signals with the video signals on the twisted pair copper cable 22 as analog signals.

The signals transmitted from $XTU_{co}$ 18 are preferably sent using an asynchronous transfer mode (ATM) protocol. Such a protocol requires ATM framing of the signals to include a timing signal used by a receiving unit decoder to decode the signal payload.

The transmitted signals are ultimately received at one or more $XTU_{cust}$ terminals 28 located at the respective customer sites 16. The $XTU_{cust}$ terminals include suitable demultiplexers and decoders for separating the telephony, data, and video signals for output at suitable customer equipment such as a telephone, modem, and television. The $XTU_{cust}$ terminal further includes multiplexers and coding arrangements which allow signals to be transmitted back to $XTU_{co}$ 18. While the same twisted pair and fiber optic cables are used for transmission of signals in both directions, the return path has been separately shown in FIG. 1 as line 30.

In accordance with the present invention, in order to extend the otherwise limited distribution range of XDSL encoded signals, a regenerator unit 32 is located at predetermined distances on the distribution line. The ATM layer transported on the distribution line will be repackaged and retransmitted at the regenerator to insure the data payload is valid. The predetermined location of a regenerator unit is calculated based on the effective loss of signal as a result of such factors as wire gauge, temperature, and distance, such that the regenerator unit will be located at a distance corresponding to a point where the calculated S/N ratio reaches a threshold of minimum acceptable signal quality. In an exemplary embodiment, the S/N ratio threshold is 18.5.

Regenerator unit 32 includes a receiver 34 for receiving signals from $XTU_{co}$ 18, a decoder 36 for analog-to-digital conversion and decoding of the payload of the received signals into base digital data, and a buffer 38 for temporarily storing the base data. Receiver 34 includes a suitable time generator for extracting the timing of the incoming signals when an ATM protocol is used. An encoder 40 then reforms or repackages the data from buffer 38 into XDSL line signals, and a line driver retransmits the encoded signals onto the distribution line. A similarly arranged receiver 44, decoder 46, buffer 48, encoder 50, and line driver 52 are provided for regenerating signals transmitted on line 30 from an $XTU_{cust}$ 28 to $XTU_{co}$ 18.

In further accordance with the present invention, two potential retransmission methods are employed by the regenerator unit. The first method provides for retransmission of signals with ATM layer processing, as the physical layer protocol may require. The other method provides for selective direct retransmission of signal from $XTU_{co}$ 18 to $XTU_{cust}$ 28 via the regenerator unit 32 for protocols which do not require ATM layer processing. Thus, decoding of the received signals into base data also allows regenerator unit 32 to advantageously reform signal payloads as needed to comport with existing protocol layers. In addition, buffering of the base data allows the transmission rate to be either fixed or variable at both connections from the regenerator unit to $XTU_{co}$ 18 and $XTU_{cust}$ 28 to optimize data through-put rate or reach distance between $XTU_{co}$ 18 and $XTU_{cust}$ 28.

Referring now to FIG. 2, a flowchart illustrates the overall operation of the regeneration unit 32. As denoted at block 100, XDSL signals transmitted from either $XTU_{co}$ 18 or $XTU_{cust}$ are received by receivers 34 or 42. The received signal payload is subsequently decoded into a base data level at block 102, and temporarily stored in the appropriate buffer at block 104. At block 106, a decision is made as to whether the destination of the signal requires ATM layer processing. If so, the payload base data is retrieved from the buffer and reframed or repackaged with the appropriate ATM framing including the necessary loop timing at block 108. If ATM layer processing required, the payload base data is retrieved from the buffer and packaged for direct retransmission at block 110.

As denoted at block 112, once the payload has been repackaged, the signal is encoded for transmission. At block 114, the encoded signal is transmitted on the distribution line using a suitable line driver. As noted above, the rate of transmission can be fixed or variable as part of a through-put optimization process.

Thus, the present invention provides a system and arrangement for distributing XDSL type signals on twisted pair copper telephone cable which effectively extends the range or reach of the signals without moving a distribution hub/central office deeper into the network. In addition, decoding the payload of the XDSL signals into digital base data as part of the regenerator processing allows the repackaging of the regenerated XDSL signal in to a desired protocol format.

While the best mode for carrying out the invention has been described in detail, those familiar with the art to which this invention relates will recognize various alternative designs and embodiments for practicing the invention as defined by the following claims.

What is claimed is:

1. A system for distributing digital subscriber line (XDSL) signals to end users over a telephone wiring plant comprising:

a central office for receiving video signals from a video source, the central office including a first XDSL transmission unit for transmitting the received video signals on a twisted pair copper cable along with other telephony and digital data signals, and receiving data signals from end users;

at least one end user location having a second XDSL transmission unit for receiving video signals from the twisted pair copper cable and transmitting data signals to the central office; and a regenerator connected to the twisted pair copper cable and located a predetermined distance from the central office, the regenerator comprising:

a receiver for receiving XDSL signals transmitted on the twisted pair copper cable from either the central office or the end user;

a decoder for decoding the payload of a received XDSL signal into base data;

an encoder for repackaging and encoding the base data into a desired protocol format; and a line driver for retransmitting the encoded signal onto the twisted pair copper cable for distribution to an original destination, wherein the predetermined distance for the location of the regenerator corresponds to a point on the twisted pair cable where the signal-to-noise ratio of a transmitted XDSL signal reaches a threshold of minimum acceptable signal quality.

2. The system of claim 1 wherein the central office transmits XDSL signal using an asynchronous transfer mode (ATM) protocol, and the regenerator encoder is arranged to selectively repackage the base data into either the ATM protocol format or a direct transmission protocol format depending on the protocol requirements of the original destination.

3. The system of claim 1 wherein the XDSL signals comprise very-high-rate digital subscriber line (VDSL) type signals.

4. The system of claim 1 wherein the XDSL signals comprise asynchronous digital subscriber line (ADSL) type signals.

5. The system of claim 1 wherein the line driver comprises a variable rate line driver.

6. The system of claim 1 wherein the line driver comprises a fixed rate line driver.

7. A method for distributing digital subscriber line (XDSL) signals to end users over a telephone wiring plant comprising:

receiving video signals at a central office from a video source;

transmitting the received video signals on a twisted pair copper cable along with other telephony and digital data signals as an XDSL type signal to a terminal located at an end user site, and receiving data signals on the twisted pair copper cable at the central office from an end user terminal;

coupling a signal regenerator unit to the twisted pair copper cable at a distance from the central office corresponding to a point on the twisted pair cable where the signal-to-noise ratio of a transmitted XDSL signal reaches a threshold of minimum acceptable signal quality;

receiving transmitted XDSL signals at the regenerator, and decoding the received signals into base data;

repackaging and encoding the base data into an XDSL signal having a desired protocol format; and retransmitting the XDSL signal to the end user terminal.

8. The method of claim 7 further comprising transmitting XDSL signals from the central office transmits using an asynchronous transfer mode (ATM) protocol, and selectively repackaging the base data into either the ATM protocol format or a direct transmission protocol format depending on the protocol requirements of the end user terminal.

9. The method of claim 7 further comprising transmitting the received video signals as very-high-rate digital subscriber line (VDSL) type signals.

10. The method of claim 7 further comprising transmitting the received video signals as asynchronous digital subscriber line (ADSL) type signals.

11. The method of claim 7 further comprising retransmitting the XDSL signals from the regenerator with a variable data rate.

12. The method of claim 7 further comprising retransmitting the XDSL signals from the regenerator with a fixed data rate.

13. A regenerator for use in a digital subscriber line (XDSL) signal type signal distribution system, the distribution system including a central office for transmitting video signals on a twisted pair copper cable along with other telephony and digital data signals to at least one end user location, the regenerator comprising:

a receiver for receiving XDSL signals transmitted on the twisted pair copper cable from either the central office or the end user;

a decoder for decoding the payload of a received XDSL signal into base data;

an encoder for repackaging and encoding the base data into a desired protocol format; and a line driver for retransmitting the encoded signal onto the twisted pair copper cable for distribution to an original destination, wherein a predetermined distance for the location of the regenerator corresponds to a point on the twisted pair cable where the signal-to-noise ratio of a transmitted XDSL signal reaches a threshold of minimum acceptable signal quality.

14. The regenerator of claim 13 wherein the receiver, decoder and encoder comprise a very-high-rate digital subscriber line (VDSL) type receiver, decoder and encoder.

* * * * *

UNITED STATES PATENT AND TRADEMARK OFFICE
CERTIFICATE OF CORRECTION

| | | |
|---|---|---|
| PATENT NO. | : 8,064,369 B1 | Page 1 of 1 |
| APPLICATION NO. | : 09/203086 | |
| DATED | : November 22, 2011 | |
| INVENTOR(S) | : Bruce A. Phillips et al. | |

It is certified that error appears in the above-identified patent and that said Letters Patent is hereby corrected as shown below:

Column 1, Line 32, delete "capability distributing" and insert --capability of distributing--, therefor.

Column 4, Line 34, delete "XTUcust are" and insert --XTUcust 28 are--, therefor.

Column 4, Line 42, delete "processing required," and insert --processing is required,--, therefor.

Signed and Sealed this
Twenty-ninth Day of May, 2012

David J. Kappos
*Director of the United States Patent and Trademark Office*